United States Patent
Matsushita (10) Patent No.: US 11,926,313 B2
(45) Date of Patent: Mar. 12, 2024

(54) IN-VEHICLE DEVICE AND CONTROL METHOD

(71) Applicant: Faurecia Clarion Electronics Co., Ltd., Saitama (JP)

(72) Inventor: Yuki Matsushita, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 129 days.

(21) Appl. No.: 17/321,846

(22) Filed: May 17, 2021

(65) Prior Publication Data
US 2021/0394746 A1 Dec. 23, 2021

(30) Foreign Application Priority Data

Jun. 18, 2020 (JP) .................................. 2020-105076

(51) Int. Cl.
| | |
|---|---|
| *B60W 30/06* | (2006.01) |
| *B60W 60/00* | (2020.01) |
| *G01C 21/34* | (2006.01) |
| *G08G 1/14* | (2006.01) |

(52) U.S. Cl.
CPC .......... *B60W 30/06* (2013.01); *B60W 60/001* (2020.02); *G01C 21/3407* (2013.01); *G08G 1/141* (2013.01)

(58) Field of Classification Search
CPC ............. B60W 30/06; B60W 60/001; B60W 60/0025; B60W 50/00; B62D 15/0285; G01C 21/3407; G08G 1/141; G08G 1/168
See application file for complete search history.

(56) References Cited

U.S. PATENT DOCUMENTS

| | | | |
|---|---|---|---|
| 11,377,099 B2 * | 7/2022 | Shoda ..................... | B60K 35/00 |
| 2016/0311429 A1 * | 10/2016 | Holland-Letz ..... | B62D 15/0285 |
| 2017/0001650 A1 * | 1/2017 | Park ..................... | B60W 30/06 |

(Continued)

FOREIGN PATENT DOCUMENTS

| | | | | |
|---|---|---|---|---|
| CN | 110023178 A | * | 7/2019 | ............ B60W 30/06 |
| EP | 3162666 A1 | * | 5/2017 | ......... B62D 15/0285 |

(Continued)

OTHER PUBLICATIONS

EP-3162666-A1 translation (Year: 2017).*

(Continued)

*Primary Examiner* — Jeff A Burke
*Assistant Examiner* — Kyle T Johnson
(74) *Attorney, Agent, or Firm* — IP Business Solutions, LLC (57) ABSTRACT

An in-vehicle device includes: an empty stall determiner that determines, based on sensing of surroundings by a sensor section provided in a vehicle, whether or not a parking stall present in surroundings of the vehicle is an empty stall; an empty stall storing section that stores information regarding a location of the empty stall determined by the empty stall determiner in association with a passing route of the vehicle; and an automatic travel controller that generates a travel route from a current location to the empty stall based on the sensing of the surroundings by the sensor section, the automatic travel controller performing control to cause the vehicle to travel along the travel route and be parked in the empty stall in a head-in manner.

6 Claims, 8 Drawing Sheets

(56) References Cited

U.S. PATENT DOCUMENTS

| | | |
|---|---|---|
| 2017/0137024 A1* | 5/2017 | Elie .................. G01B 11/22 |
| 2017/0144654 A1* | 5/2017 | Sham ................. G08G 1/148 |
| 2017/0197615 A1* | 7/2017 | Elie .................. B60W 30/06 |
| 2017/0285654 A1* | 10/2017 | Nagai ............... G06Q 10/043 |
| 2018/0328750 A1* | 11/2018 | Yun .................. G08G 1/143 |
| 2018/0354502 A1* | 12/2018 | Yaldo ............... B62D 15/0285 |
| 2019/0066514 A1 | 2/2019 | Yamamura |
| 2019/0135275 A1* | 5/2019 | Park ................. G05D 1/0282 |
| 2020/0070890 A1* | 3/2020 | Hattori ............... H04W 4/38 |
| 2020/0361462 A1* | 11/2020 | Noguchi ............. B60W 30/143 |
| 2021/0061264 A1* | 3/2021 | Stefan ............. B60W 60/00184 |
| 2021/0197800 A1* | 7/2021 | Matsushita ........ B62D 15/0285 |
| 2021/0217310 A1* | 7/2021 | Ikoma ................ B60W 30/06 |
| 2021/0300341 A1* | 9/2021 | Shoda ................ G06V 20/58 |
| 2021/0354686 A1* | 11/2021 | Pan .................... G08G 1/14 |
| 2021/0394746 A1* | 12/2021 | Matsushita ........... G08G 1/168 |
| 2021/0402986 A1 | 12/2021 | Imai et al. |

FOREIGN PATENT DOCUMENTS

| | | |
|---|---|---|
| JP | 2005-182504 A | 7/2005 |
| JP | 2016-007920 A | 1/2016 |
| JP | 2018-200508 A | 12/2018 |
| JP | 2019-038493 A | 3/2019 |
| JP | 2020-083006 A | 6/2020 |
| WO | 2017/168754 A1 | 10/2017 |

OTHER PUBLICATIONS

CN-110023178-A translation (Year: 2019).*
Japnaese Office Action mailed by Japanese Patent Office dated Jan. 9, 2024 in corresponding Japanese patent application No. 2020-105076.

* cited by examiner

IN-VEHICLE DEVICE AND CONTROL METHOD

INCORPORATION BY REFERENCE

The present application claims priority under 35 U.S.C. § 119 to Japanese Patent Application No. 2020-105076 filed on Jun. 18, 2020. The content of the application is incorporated herein by reference in its entirety.

BACKGROUND OF THE INVENTION

Field of the Invention

The present invention relates to an in-vehicle device and a control method.

Description of the Related Art

An example of a typical technology related to automated valet parking is International Publication No. WO 2017/168754 (hereinafter, referred to as Patent Literature 1). The SUMMARY section of Patent Literature 1 describes that "[an] automatic parking system includes an automatic parking control device (10) that controls automatic parking of a vehicle equipped with an automatic travel function and a mobile terminal (20) configured to communicate with the automatic parking control device (10). The automatic parking control device (10) searches for an empty parking stall and sends a result of the search to the mobile terminal (20). The mobile terminal (20) sends, in response to receiving the result of searching for an empty parking stall from the automatic parking control device (10), instructions regarding selection of a parking stall to the automatic parking control device (10) based on an operation by a user. The automatic parking control device (10) selects a target parking stall from among detected empty parking stalls based on the instructions receive from the mobile terminal (20) and causes the vehicle to be automatically parked in the target parking stall."

In controlling automatic parking, the automatic parking control device of Patent Literature 1 starts automatic travel of a vehicle, for example, after ascertaining existence of an empty stall among parking stalls in the surroundings of the vehicle from determination based on a result of detection by a sensor. Further, to park the vehicle in the empty stall during the automatic travel, a K-turn operation is performed, slightly moving the vehicle forward or in reverse to adjust a wheel angle.

However, during such a K-turn operation, a subsequent vehicle would be parked first in the empty parking stall or the vehicle would disturb a nearby traffic.

An object of the present invention is to provide an in-vehicle device and a control method that achieve more favorable automatic parking in an empty stall among parking stalls.

SUMMARY OF THE INVENTION

An in-vehicle device according to an aspect of the present invention includes: an empty stall determiner that determines, based on sensing of surroundings by a sensor section provided in a vehicle, whether or not a parking stall present in surroundings of the vehicle is an empty stall; an empty stall storing section that stores information regarding a location of the empty stall determined by the empty stall determiner in association with a passing route of the vehicle; and an automatic travel controller that generates a travel route from a current location to the empty stall based on the sensing of the surroundings by the sensor section and performs control to cause the vehicle to travel along the travel route and be loaded into the empty stall in a head-in manner.

According to the aspect of the present invention, it is possible to achieve more favorable parking in an empty stall.

DETAILED DESCRIPTION OF THE PREFERRED EMBODIMENT

Description will be made below on an embodiment of the present invention with reference to the drawings.

Figure 1:
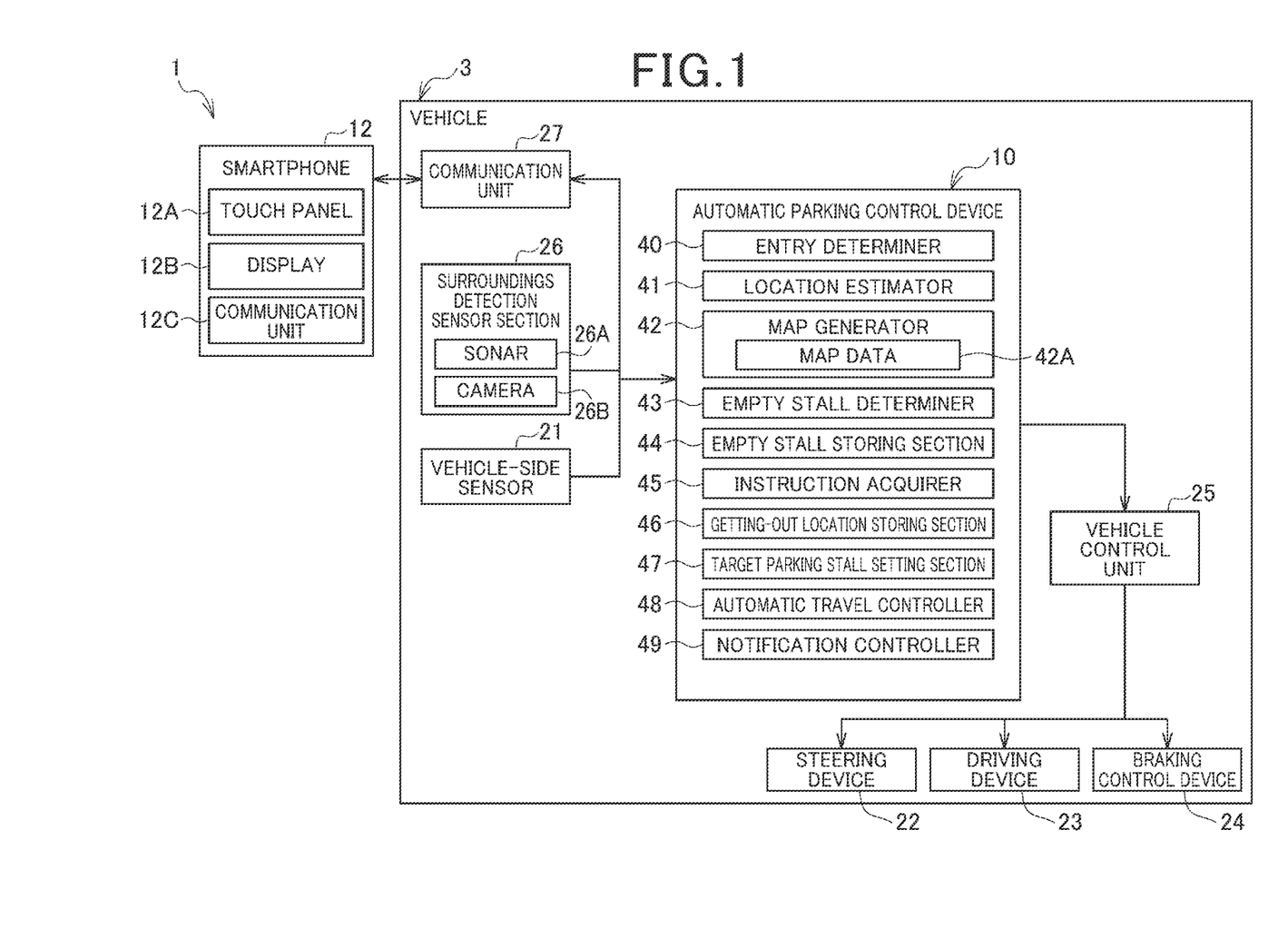
FIG. 1 shows a configuration of an automated valet parking system according to an embodiment of the present invention.
Figure 2:
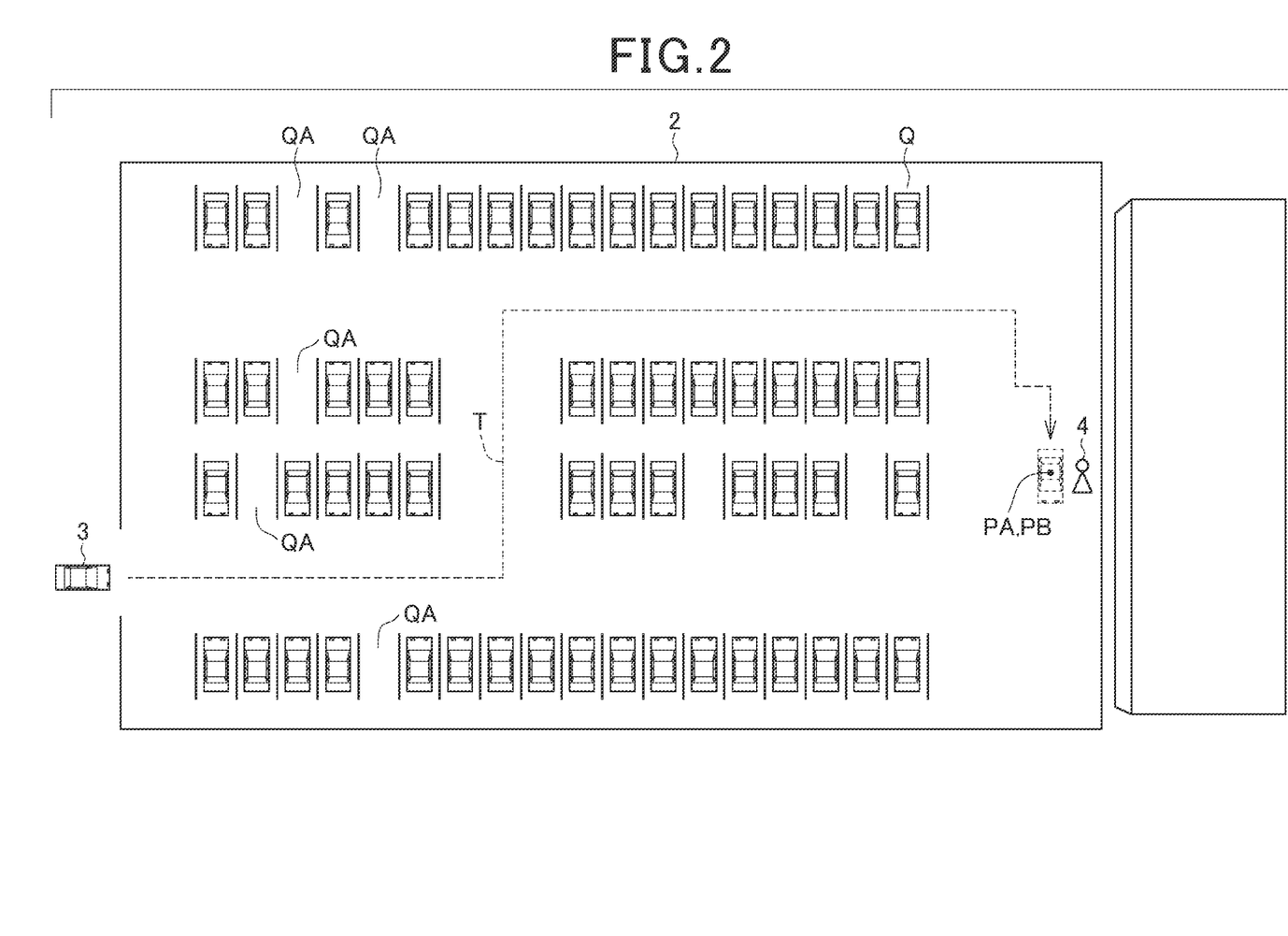
FIG. 2 is a diagram for explaining an operation of the automated valet parking system.

FIG. 1 shows a configuration of an automated valet parking system 1 according to the present embodiment. FIG. 2 is a diagram for explaining an operation of the automated valet parking system 1.

The automated valet parking system 1 according to the present embodiment is a system that enables a vehicle 3 to be automatically parked in a parking lot 2 with a plurality of parking stalls Q as shown in FIG. 2.

Here, in the present embodiment, description will be made on a case where the automatic parking includes both operations for automatic loading and automatic unloading of the vehicle 3; however, the automatic parking includes only automatic loading of the vehicle 3.

Automatic loading refers to an operation where the vehicle 3 automatically travels from a getting-out location PA for an occupant 4 to one of empty stalls QA among the parking stalls Q and the vehicle 3 is autonomously loaded in the empty stall QA to be parked as shown in FIG. 2.

Automatic unloading refers to an operation where the parked vehicle 3 is autonomously unloaded from the parking stall Q in response to a call from the occupant 4 and the vehicle 3 automatically travels to a destination location PB as shown in FIG. 2.

The destination location PB is, for example, a waiting location for the occupant 4 (in the example in FIG. 2, the waiting location is the same as the getting-out location PA) or a location specified by the occupant 4.

Further, automatic travel refers to autonomous travel of the vehicle 3 without a driving maneuver of the occupant 4 (in other words, even in an unmanned state).

The automated valet parking system 1 includes an automatic parking control device 10 and a smartphone 12 as shown in FIG. 1.

The automatic parking control device 10 is an in-vehicle device that is to be installed in the vehicle 3 to perform control for automatic parking.

The smartphone 12 is mobile electronic equipment (so-called mobile terminal) that is to be carried by the occupant 4.

The automatic parking control device 10 and the smartphone 12 are configured to communicate with each other through an appropriate electric communication line such as the Internet or a mobile phone communication network.

The smartphone 12 according to the present embodiment is used as equipment for the occupant 4 to input instructions regarding automatic parking of the vehicle 3. As shown in FIG. 1, the smartphone 12 includes a touch panel 12A serving as an operator that receives an operation by the occupant 4, a display 12B serving as a display section that displays a variety of information, and a communication unit 12C that communicates with the automatic parking control device 10.

It should be noted that the communication unit 12C includes a receiving device (receiver, circuit) and a transmitting device (transmitter, circuit) for communication with the automatic parking control device 10. The smartphone 12 may include, for example, a gesture detector that detects a gesture as an operator that receives an operation by an occupant. Any mobile electronic device such as a tablet PC is also usable in place of the smartphone 12.

The vehicle 3 is configured to automatically travel in accordance with control by the automatic parking control device 10.

Superficially, as shown in FIG. 1, the vehicle 3 includes a vehicle-side sensor 21, a steering device 22, a driving device 23, a braking control device 24, a vehicle control unit 25, a surroundings detection sensor section 26, and a communication unit 27, which are connected directly or via an appropriate in-vehicle network, such as a CAN (Controller Area Network), to the automatic parking control device 10.

The vehicle-side sensor 21 includes a variety of sensors for detecting a variety of information required for control of autonomous travel of the vehicle 3 and autonomous navigation (dead reckoning). Examples of such sensors include a gyroscope sensor, an acceleration sensor, a vehicle speed sensor that detects a vehicle speed of the vehicle 3, and a steering angle sensor that detects a steering angle of the vehicle 3.

The steering device 22 is a device including an actuator that steers a steering wheel of the vehicle 3.

The driving device 23 is a device including an actuator that adjusts a driving force of a drive wheel of the vehicle 3. In a case where a power source for the vehicle 3 is an engine, the actuator of the driving device 23 is a throttle actuator. In a case where the power source is a motor, the actuator of the driving device 23 is a motor.

The braking control device 24 includes an actuator that controls a braking force being applied to a wheel of the vehicle 3 by controlling a braking system (brake) provided in the vehicle 3.

The vehicle control unit 25 is a device that controls the steering device 22, the driving device 23, and the braking control device 24 to cause the vehicle 3 to autonomously travel (automatically travel).

The vehicle control unit 25 includes a computer (for example, ECU (Electronic Control Unit)) that performs such control.

The surroundings detection sensor section 26, which includes a variety of sensors for sensing information regarding surroundings of the vehicle 3, outputs the information regarding the surroundings acquired by sensing to the automatic parking control device 10. The information regarding the surroundings is hereinafter referred to as "surroundings information".

The surroundings information includes information regarding an object present in the surroundings of the vehicle 3 and this information is used for controlling automatic travel, automatic loading, or automatic unloading. Examples of such a surrounding object include an obstacle and zoning lines that zone a travel route for the vehicle 3 and the parking stalls Q. Examples of the obstacle include a variety of objects that disturb the travel of the vehicle 3. Typical examples of the obstacle include building structures such as a column and a wall, another vehicle that is parked or is traveling, and a pedestrian.

The surroundings detection sensor section 26 according to the present embodiment includes, as a sensor, a sonar 26A and a camera 26B.

The sonar 26A is a ranging sensor that senses a surrounding obstacle with a sound wave to measure a distance between the obstacle and the vehicle 3.

Figure 3:
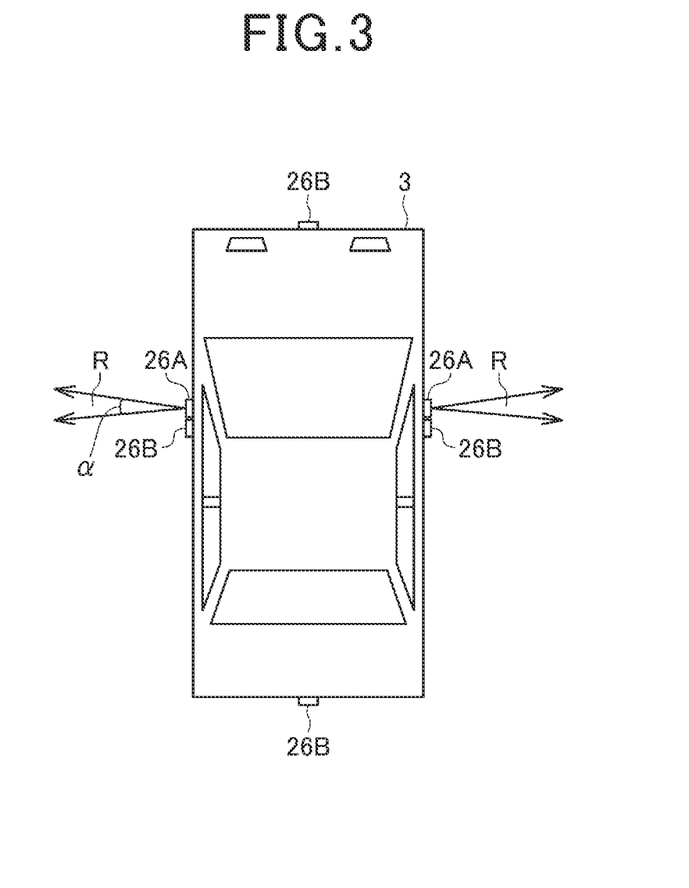
FIG. 3 shows an example of an installation manner of a sonar and a camera.

The vehicle 3 of the present embodiment is provided with, for example, respective sonars 26A on a left side and a right side thereof as shown in FIG. 3. Obstacles in sensing ranges R on the right side and the left side of the vehicle 3 are sensed by the respective sonars 26A. By virtue of the sensing ranges R each being in a beam form, the sonars 26A of the present embodiment each have an enhanced directionality to a lateral side of the vehicle 3. This causes an obstacle on each of the lateral sides of the vehicle 3 to be detected with a higher accuracy.

It should be noted that locations of the sonars 26A are not limited to the locations shown in FIG. 3 and any location that allows for sensing of an obstacle or the like required for automatic travel is acceptable. Alternatively, the sonars 26A may each be replaced with any other ranging sensor such as a radar or a lidar.

The camera 26B is an imaging means that captures an image of a surrounding object such as the zoning lines of the travel route and the parking stalls Q.

The vehicle 3 of the present embodiment is provided with respective cameras 26B on a front side, the left side, the right side, and a rear side thereof as shown in FIG. 3. These cameras 26B perform omnidirectional (360-degree-range) imaging around the vehicle 3.

It should be noted that a single camera 26B may perform omnidirectional imaging. Further, imaging ranges of the cameras 26B and the number of the cameras 26B may be changed as appropriate in accordance with the sensing ranges around the vehicle 3.

The communication unit 27 is a device that communicates with the smartphone 12 through an electric communication line to relay communication between the smartphone 12 and the automatic parking control device 10. The communication unit 27 is, for example, a TCU (Telematics Control Unit), which includes a receiving device (receiver, circuit) and a transmitting device (transmitter, circuit) for communication through an electric communication line.

The automatic parking control device 10 includes a computer (in the present embodiment, an ECU), which includes a processor such as a CPU (Central Processing Unit) or an MPU (Microprocessor Unit), a memory device (memory) (also referred to as a main storage device) such as an ROM (Read Only Memory) or an RAM (Random Access Memory), a storage device (memory) (also referred to as an auxiliary storage device) such as an HDD (Hard Disk Drive) or an SSD (Solid State Drive), an interface circuit for connection to sensors and peripheral equipment, and an in-vehicle network communication circuit that communicates with another in-vehicle device through an in-vehicle network.

In the automatic parking control device 10, the processor executes a computer program stored in the memory device or the storage device, thereby implementing a variety of functional components shown in FIG. 1.

In other words, the automatic parking control device 10 includes, the functional components, an entry determiner 40, a location estimator 41, a map generator 42, an empty stall determiner 43, an empty stall storing section 44, an instruction acquirer 45, a getting-out location storing section 46, a target parking stall setting section 47, an automatic travel controller 48, and a notification controller 49.

The entry determiner 40 determines whether or not the vehicle 3 enters the parking lot 2. Such entry determination can be performed by a common or known appropriate method. For example, the entry determiner 40 may perform the determination based on comparison between a location of the parking lot 2 indicated by road map data and a location (absolute location) of the vehicle 3 obtained from a GPS or the like. Alternatively, for example, the entry determiner 40 may perform the determination based on whether or not the vehicle 3 has received a signal or the like outputted from equipment installed in the parking lot 2. Alternatively, for example, the entry determiner 40 may perform the determination based on whether or not the occupant 4 has performed an operation to indicate that the vehicle 3 enters the parking lot 2.

The location estimator 41 estimates a current location (self location) of the vehicle 3 by a common or known method of dead reckoning at least during a period from entry of the vehicle 3 into the parking lot 2 to exit therefrom.

The map generator 42 records respective locations of a passing route T, an obstacle, and the parking stalls Q in the parking lot 2, generating map data 42A where the respective locations are associated with each other.

The passing route T is a route where the vehicle 3 has passed in the parking lot 2 as shown in FIG. 2.

The map data 42A is data where respective location coordinates of the passing route T, the obstacle, and the parking stalls Q are mapped in an appropriate coordinate space.

The map generator 42 functions as a passing route acquiring means that sequentially obtains the passing route T by tracing the current location estimated by the location estimator 41 while the vehicle 3 is in the parking lot 2. The map generator 42 updates and records the passing route T in the map data 42A.

In addition, the map generator 42 also functions as an obstacle detecting means that detects an obstacle present in the surroundings of the vehicle 3 based on surroundings information (i.e., a result of sensing by the sonars 26A and an image captured by the cameras 26B). The map generator 42 records, in response to detecting an obstacle, a location of the obstacle in the map data 42A.

Further, the map generator 42 also functions as a parking stall detecting means that detects any of the parking stalls Q present in the surroundings of the vehicle 3 based on the surroundings information (i.e., a result of sensing by the sonars 26A and an image captured by the cameras 26B). The map generator 42 records, in response to detecting the parking stall Q, a location of the parking stall Q in the map data 42A.

A known or common appropriate method can be used as the detection method of an obstacle and the parking stalls Q based on the surroundings information.

The empty stall determiner 43 determines whether or not the parking stall Q is the empty stall QA based on detection results of the parking stall Q and the obstacle. Specifically, in a case where there is no obstacle within the parking stall Q, the empty stall determiner 43 determines that the parking stall Q is the empty stall QA. In addition, in a case where the vehicle 3 reaches a later-described target parking stall QB, the empty stall determiner 43 likewise determines that the target parking stall QB is an empty stall available for parking based on the detection result of an obstacle. Specifically, in a case where when the vehicle 3 reaches the target parking stall QB, there is an obstacle, such as another vehicle parked or a shopping cart, in the target parking stall QB, the empty stall determiner 43 determines that the target parking stall QB is not an empty stall available for parking. In a case where when the vehicle 3 reaches the target parking stall QB, there is no obstacle in the target parking stall QB, the empty stall determiner 43 determines that the target parking stall QB is an empty stall available for parking.

The empty stall storing section 44 stores a location of the empty stall QA in association with the passing route T. This makes it possible to identify the empty stall QA near the passing route T. It should be noted that the location of the empty stall QA may be recorded in the map data 42A.

The instruction acquirer 45 acquires instructions of the occupant 4 regarding automatic parking from the smartphone 12 via the communication unit 27. Examples of the instructions include instructions regarding automatic loading and instruction regarding automatic unloading.

The getting-out location storing section 46 stores, as the getting-out location PA, the current location of the vehicle 3 reached when the occupant 4 gets out of the vehicle 3.

It is possible to detect whether or not the occupant 4 gets out of the vehicle 3 by a common or known appropriate technology.

For example, in a case where the vehicle 3 is equipped with a door open/close sensor that detects whether or not a door of the vehicle 3 is opened, the automatic parking control device 10 can detect whether or not the occupant 4 gets out of the vehicle 3 by detecting whether or not the door is opened while the vehicle 3 is stopped based on detection signals from the door open/close detection sensor and the vehicle speed sensor.

Alternatively, for example, in a case where the vehicle 3 is equipped with a seat-surface pressure sensor that detects a seat-surface pressure of a seat, the automatic parking control device 10 can detect whether or not the occupant 4 gets out of the vehicle 3 by detecting whether or not no pressure is applied to a seat surface of the seat based on a detection signal from the seat-surface pressure sensor.

Figure 6:
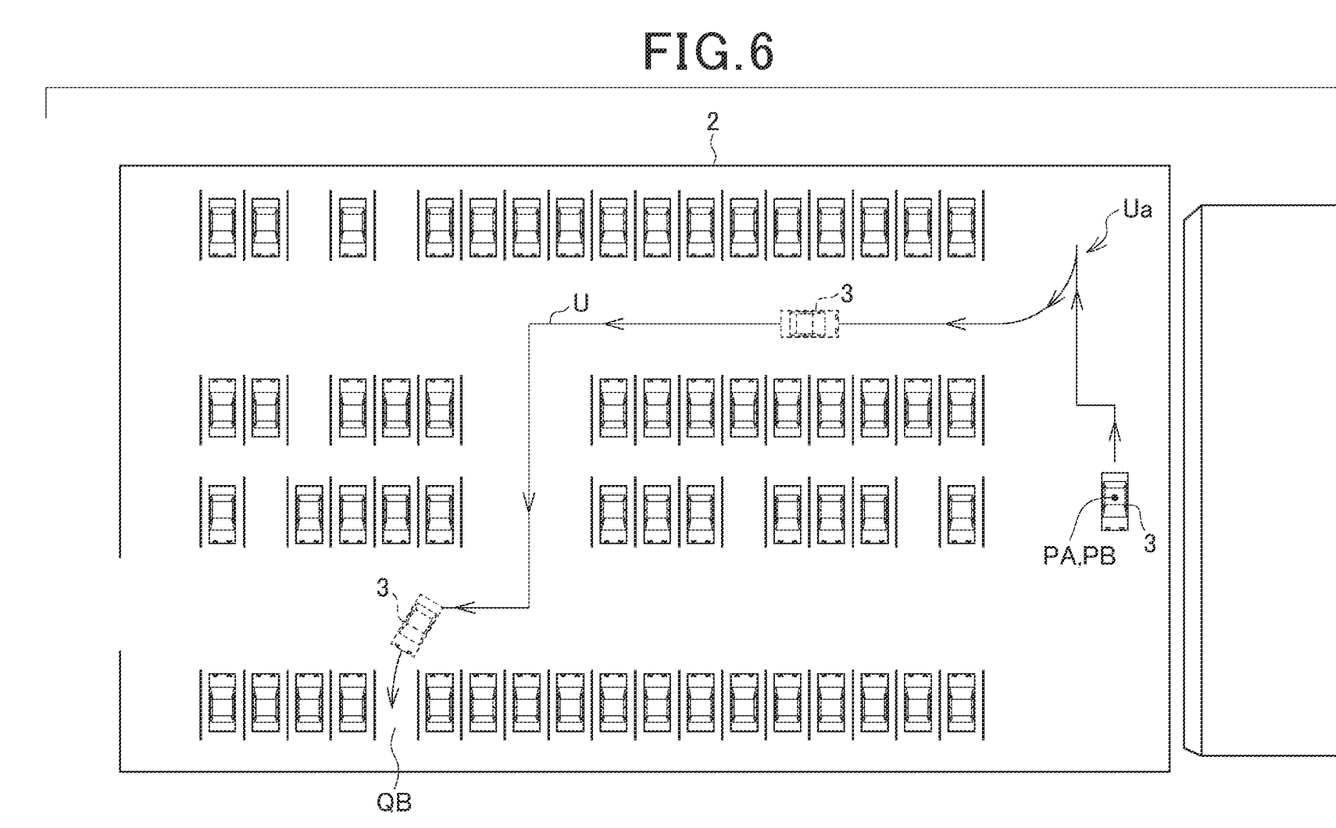
FIG. 6 shows an example of an automatic travel route for automatic loading.

The target parking stall setting section 47 sets target one of the parking stalls Q for the vehicle 3 to be parked from among the empty stalls QA. Hereinafter, the target one of the parking stalls Q is referred to as the target parking stall QB (FIG. 6).

The setting of the target parking stall QB may be manual setting by the occupant 4 or automatic setting by the target parking stall setting section 47. The automatic setting is performed based on predetermined selection conditions (for example, a distance from the getting-out location PA). The selection conditions may be settable in the automatic parking control device 10 in advance by the occupant 4.

It should be noted that setting timing for the target parking stall QB is determined as desired. The setting timing may be either a timing after the occupant 4 gets out of the vehicle 3 (after the getting-out location PA is determined) or a timing before the getting-out location PA is determined.

The automatic travel controller 48 sets, based on the map data 42A, a route for the vehicle 3 to automatically travel from the getting-out location PA to the target parking stall QB (hereinafter, referred to as "automatic travel route U").

In addition, the automatic travel controller 48 generates control information for automatic loading and automatic unloading based on the automatic travel route U and outputs the control information to the vehicle control unit 25.

More specifically, for an automatic loading operation, the automatic travel controller 48 generates control information for autonomous travel of the vehicle 3 from the getting-out location PA to the target parking stall QB and control information for autonomous loading of the vehicle 3 into the target parking stall QB. In this case, the automatic travel controller 48 generates control information for causing the vehicle 3 to start an operation for loading into the target parking stall QB before passing through the target parking stall QB to be loaded in a head-in manner (i.e., head-in parking) without a K-turn operation. The K-turn operation is an operation where the vehicle 3 is moved forward or in reverse to adjust a wheel angle and then again moved forward or in reverse.

Meanwhile, for an automatic unloading operation, the automatic travel controller 48 generates control information for autonomous unloading of the vehicle 3 from the target parking stall QB and autonomous travel of the vehicle 3 to the destination location PB.

The notification controller 49 outputs a variety of notifications regarding automatic parking to the smartphone 12 of the occupant 4 through the communication unit 27.

Figure 4:
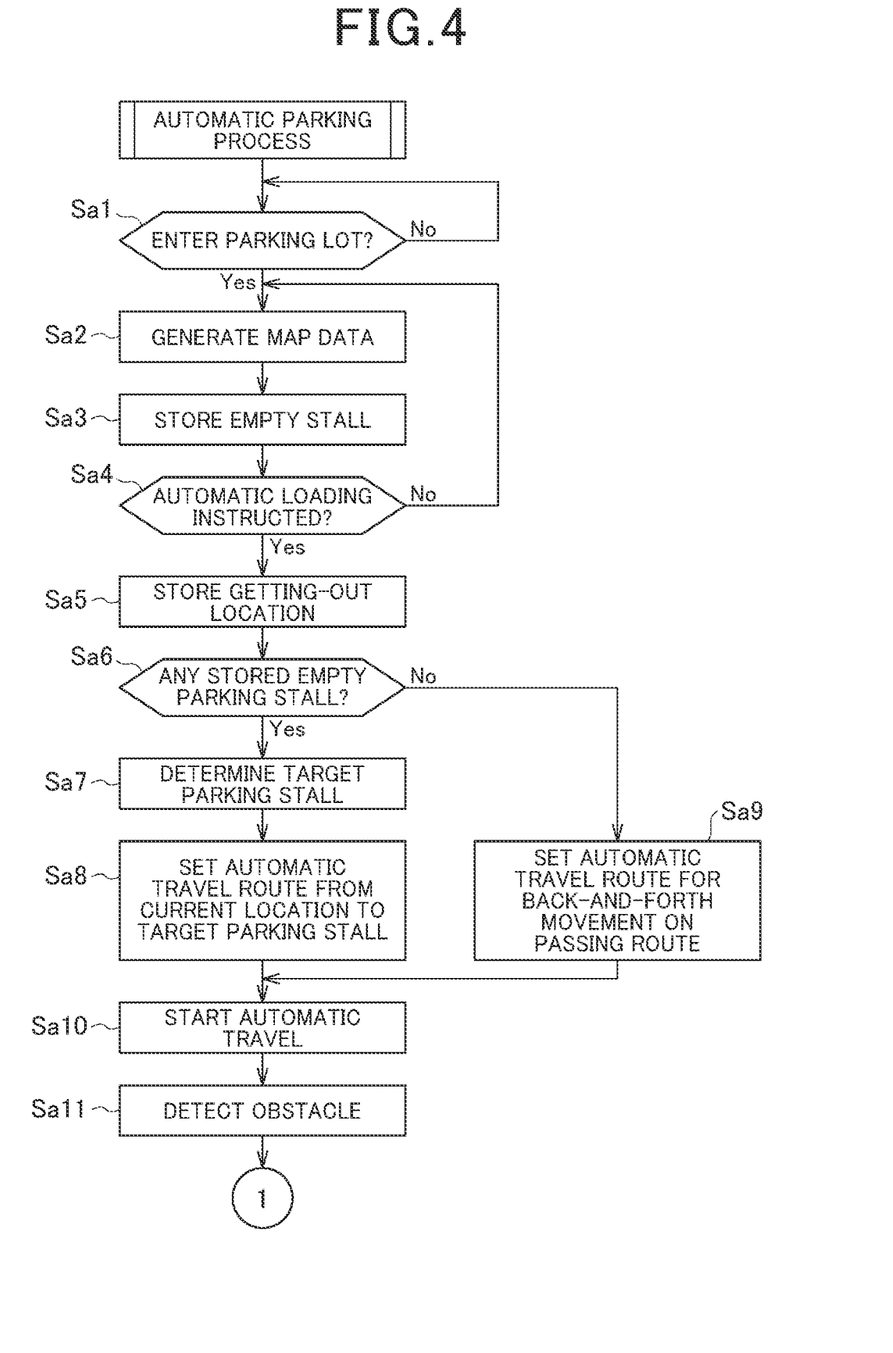
FIG. 4 is a flowchart of an automatic parking process related to an operation of an automatic parking control device.
Figure 5:
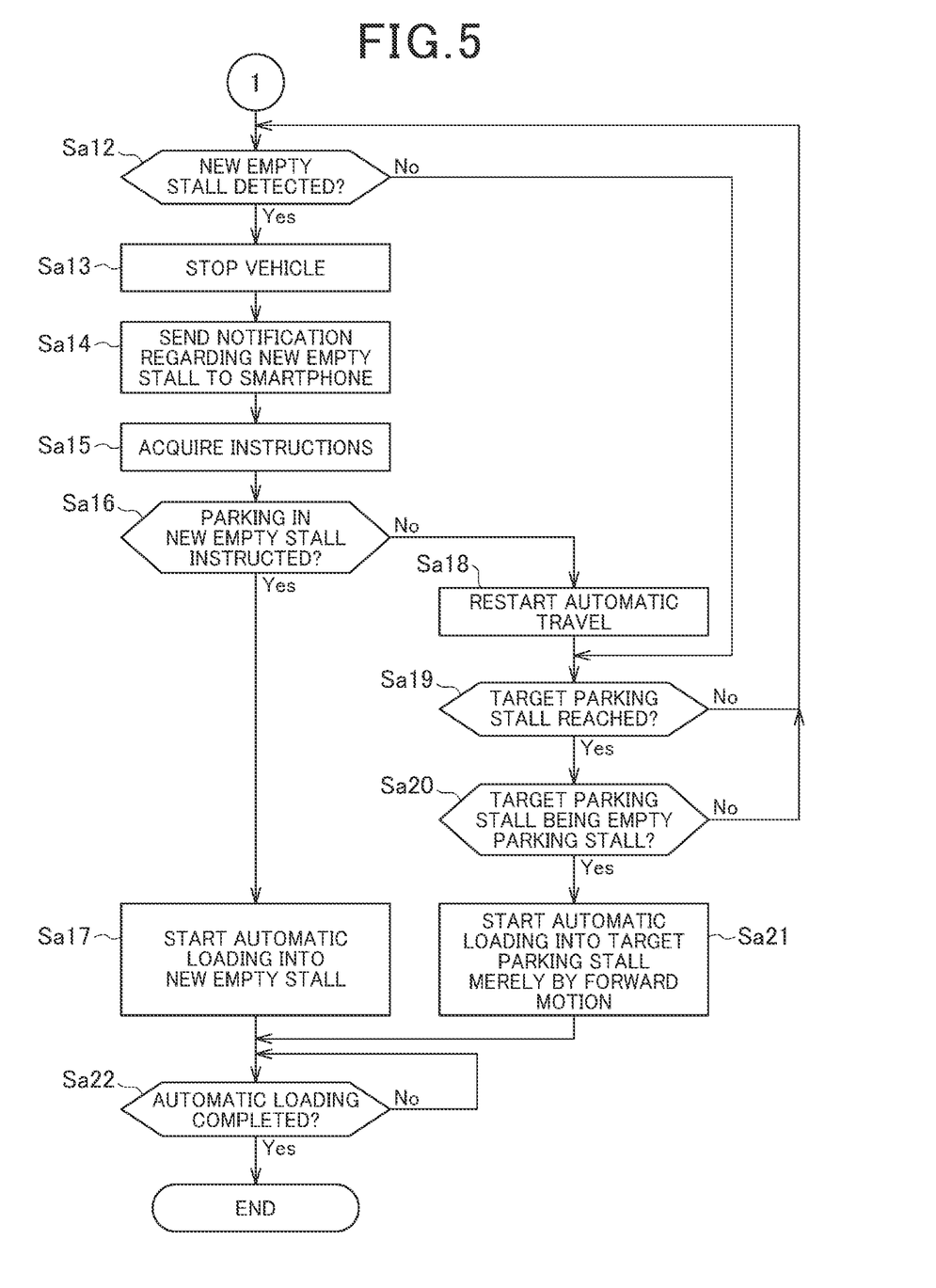
FIG. 5 is the flowchart of the automatic parking process related to the operation of the automatic parking control device.

FIG. 4 and FIG. 5 show a flowchart of an automatic parking process regarding the operation of the automatic parking control device 10.

When the vehicle 3 enters the parking lot 2 and the entry determiner 40 detects the entry (step Sa1: YES), the map generator 42 continuously traces the passing route T of the vehicle 3 and detects an obstacle and a parking stall Q, thereby generating the map data 42A (step Sa2). Thus, storing of an empty stall QA is started at the same time as the entry and an empty stall QA is being detected along a travel route of the vehicle 3 by using the surroundings detection sensor section 26 provided in the vehicle 3. This eliminates the necessity of installing equipment such as a road-to-vehicle communication device that obtains information regarding an empty stall QA.

The empty stall determiner 43 determines, in response to detection of a parking stall Q, whether or not the parking stall Q is an empty stall QA. If the parking stall Q is determined to be an empty stall QA by the empty stall determiner 43, the empty stall storing section 44 stores information regarding the empty stall QA (step Sa3). In this case, the empty stall storing section 44 holds information regarding a plurality of empty stalls QA, if necessary. In other words, in a case where the information regarding an empty stall QA has already been stored in the empty stall storing section 44, when a new empty stall QA is detected, information regarding the new empty stall QA is additionally stored in the empty stall storing section 44 instead of the information regarding the previous empty stall QA is updated with the information regarding the new empty stall. The empty stall storing section 44 thus holds information regarding both the empty stalls QA.

Afterwards, the occupant 4 gets out of the vehicle 3 at the getting-out location PA as desired and operates the smartphone 12 to give instructions regarding automatic loading.

The automatic parking control device 10 repeatedly performs the above-described processes of step Sa2 and step Sa3 until the instruction acquirer 45 receives the instructions regarding automatic loading. Then, in response to receiving the instructions regarding automatic loading (step Sa4: Yes), the automatic parking control device 10 performs a next process.

First, the getting-out location storing section 46 stores the current location as the getting-out location PA (step Sa5).

Next, the target parking stall setting section 47 determines whether or not any empty stall QA is stored in the empty stall storing section 44 (step Sa6).

If empty stalls QA are stored (step Sa6: Yes), the target parking stall setting section 47 determines the target parking stall QB from among the empty stalls QA (step Sa7).

The automatic travel controller 48 then sets the automatic travel route U based on the map data 42A (step Sa8).

FIG. 6 shows an example of the automatic travel route U. As shown in this drawing, the automatic travel route U includes at least one K-turn route Ua for a change in direction from a reverse motion to a forward motion. The vehicle 3 is changed in direction on the K-turn route Ua after moved in reverse from the getting-out location PA, being moved forward toward the target parking stall QB.

If no empty stall QA is stored (step Sa6: No), no target parking stall QB can be set, so that the target parking stall setting section 47 sets no target parking stall QB at this stage. In this case, the automatic travel controller 48 sets, as the automatic travel route U, a route where a U-turn, a reverse motion, or the like is performed at a terminal end to perform a back-and-forth movement on a part or the whole of the passing route T based on the map data 42A (step Sa9). As described later, a new empty stall QA is being detected during the back-and-forth movement of the vehicle 3 on the automatic travel route U.

Subsequently, the automatic travel controller 48 generates control information for automatic travel of the vehicle 3 based on the automatic travel route U and outputs the control information to the vehicle control unit 25, thereby starting the automatic travel (step Sa10).

During the automatic travel, the map generator 42 detects an obstacle (step Sa11). The empty stall determiner 43 then determines whether or not each of the parking stalls Q is an empty stall QA based on a detection result of an obstacle (step S12). Thus, an empty stall QA newly provided as a result of unloading of another vehicle or the like is being continuously detected.

In a case where a new empty stall QA is detected (step Sa12: Yes), the automatic travel controller 48 performs control for temporarily stopping the vehicle 3 on the spot (step Sa13).

The notification controller 49 then notifies the smartphone 12 of the occupant 4 of the detection of the new empty stall QA and an inquiry of whether or not the vehicle 3 is to be parked in the new empty stall QA (step Sa14).

Afterwards, the automatic parking control device 10 acquires instructions of the occupant 4 responsive to the inquiry included in the notification (step Sa15).

In a case where the instructions of the occupant indicate that the vehicle 3 is to be parked in the new empty stall QA (step Sa16: Yes), the automatic travel controller 48 generates control information for causing the vehicle 3 to be automatically loaded in the new empty stall QA and outputs the control information to the vehicle control unit 25 (step Sa17). As a result, the vehicle 3 starts automatic loading into the new empty stall QA.

Figure 7:
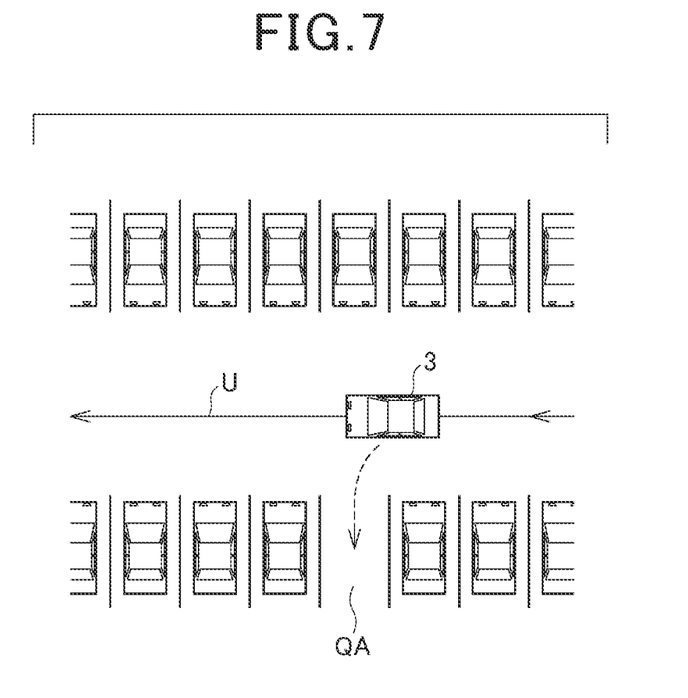
FIG. 7 is a diagram for explaining an operation of loading into an empty stall detected during automatic travel.

By virtue of such a process being performed, in a case where the vehicle 3 automatically travels along the automatic travel route U, the occupant 4 outputs, responsive to detection of a new empty stall QA, instructions via the smartphone 12, thereby allowing the vehicle 3 to be automatically loaded in the empty stall QA as shown in FIG. 7.

Meanwhile, if the instructions of the occupant 4 indicate that the vehicle 3 is not to be parked in the new empty stall QA (step Sa16: No), the automatic travel controller 48 restarts the automatic travel along the automatic travel route U (step Sa18).

Thus, by virtue of the instructions of the occupant 4 being received in step Sa16, it is possible to make a real-time determination regarding parking in the empty stall QA in line with an intent of the occupant 4.

If no new empty stall QA is detected in step Sa12 (step Sa12: No) or if the automatic travel is restarted in step Sa18, the automatic travel controller 48 monitors relative locations of the target parking stall QB and the vehicle 3 based on the map data 42A and the current location of the vehicle 3 during the automatic travel of the vehicle 3.

The automatic parking control device 10 continuously detects a new empty stall QA by repeatedly performing the processes from step Sa12 to step Sa16 until the vehicle 3 reaches the target parking stall QB (i.e., until step Sa19=No).

Then, when the vehicle 3 reaches a spot immediately before the target parking stall QB (step Sa19: Yes), the empty stall determiner 43 determines whether or not the target parking stall QB is an empty stall QA available for parking at that time (step Sa20). If the target parking stall QB is an empty stall QA available for parking (step Sa20: Yes), the process proceeds to next step Sa21. In step Sa21, the automatic travel controller 48 generates control information for causing the vehicle 3 to be automatically loaded into the target parking stall QB in a head-in manner without a K-turn operation, in other words, merely by a forward motion, and outputs the control information to the vehicle control unit 25 (step Sa21). This causes the vehicle 3 to start automatic loading from the spot immediately before the target parking stall QB merely by a forward motion.

Thus, by virtue of performing automatic loading into the target parking stall QB set based on the empty stalls QA stored in advance, the automatic loading by a forward motion becomes possible, which allows for more prompt automatic loading than in a case where parking is performed by a reverse motion.

Meanwhile, as a result of the determination in the step Sa20, the target parking stall QB is determined not to be an empty stall QA available for parking (step Sa20: No), the automatic travel controller 48 sets, as the automatic travel route U, a route for the vehicle 3 to perform a U-turn, a reverse motion, or the like at a terminal end to move back and forth on a part or the whole of the passing route T based on the map data 42A and detects a new empty stall QA with the process returned to step Sa12. In this case, if the obstacle detected by the target parking stall QB is another vehicle, for example, the target parking stall setting section 47 may delete setting regarding the target parking stall QB. This is because in a case where another vehicle has already been parked in the target parking stall QB, an occupant of the other vehicle is supposed to be away from the vehicle for shopping or the like and the other vehicle is unlikely to be unloaded to make the target parking stall QB available for parking during the automatic travel on the automatic travel route U where the vehicle 3 moves back and forth.

Thus, the determination performed in step Sa20 makes it possible to again search for another empty stall QA available for parking even in a case where another vehicle is first parked before the vehicle 3 reaches the target parking stall QB. In addition, a storage resource can be efficiently used.

If the automatic loading in step Sa17 or step Sa21 is completed (step Sa22: Yes), the automatic parking control device 10 terminates the process.

It should be noted that regarding to the automatic loading into the new empty stall QA in step Sa17, a parking direction may be either head-in parking or head-out parking. Further, the automatic loading operation may include a K-turn operation.

In more detail, the sonars 26A of the surroundings detection sensor section 26 of the present embodiment each have the sensing range R in a beam form as shown in FIG. 3 described above, so that presence or absence of an obstacle in a parking stall Q cannot be ascertained until the parking stall Q comes in front of any of the sonars 26A. In other words, at a moment when the parking stall Q is determined to be an empty stall QA, the empty stall QA is located on a lateral side of the vehicle 3 or a rear side relative to the lateral side. Accordingly, in this case, to allow the vehicle 3 to be loaded into the empty stall QA, the automatic parking control device 10 (the automatic travel controller 48) generates an automatic travel route allowing for loading into the empty stall QA with a K-turn operation not necessarily excluded based on a relative location relationship between the vehicle 3 and the empty stall QA and a location of the surrounding obstacle.

Description is made on an operation for automatic unloading. The occupant 4 sends instructions regarding automatic unloading to the automatic parking control device 10 of the vehicle 3, which is parked, by operating the smartphone 12. In this case, the smartphone 12 also sends location information regarding the destination location PB, which is a getting-in location for the occupant 4. The destination location PB is an appropriate location such as a location specified on the map by the occupant 4 or a current location of the smartphone 12.

In the automatic parking control device 10, in response to the instruction acquirer 45 acquiring the instructions regarding automatic unloading, the automatic travel controller 48 generates an automatic travel route U from a current location where the vehicle 3 is parked to the destination location PB based on the map data 42A, generates control information for automatic travel of the vehicle 3 based on the automatic travel route U, and outputs the control information to the vehicle control unit 25. The vehicle 3 thus starts to be automatically unloaded, automatically traveling to the destination location PB after completion of the automatic unloading.

Further, in a case where the instructions regarding automatic unloading are acquired before completion of loading after start of automatic travel, the automatic parking control device 10 terminates the operation related to automatic loading. The automatic travel controller 48 then generates an automatic travel route U from the current location to the destination location PB based on the map data 42A to start automatic travel to the destination location PB.

The present embodiment achieves the following effects.

The automatic parking control device 10 of the present embodiment includes: the empty stall determiner 43 that determines whether or not a parking stall Q present in the surroundings of the vehicle 3 is an empty stall QA based on sensing of surroundings by the surroundings detection sensor section 26; the empty stall storing section 44 that stores information regarding the location of the empty stall QA determined by the empty stall determiner 43 in association with the passing route T of the vehicle 3; and the automatic travel controller 48 that generates an automatic travel route U from the getting-out location PA to the target parking stall QB (the empty stall QA) and performs control to cause the vehicle 3 to travel along the automatic travel route U and be loaded into the target parking stall QB in a head-in manner.

In this configuration, the empty stall QA present in the surroundings of the passing route T is stored in advance. Further, the automatic travel route U for allowing the vehicle 3 to be loaded into the empty stall QA in a head-in manner without a K-turn operation is generated, which makes it possible to promptly complete the automatic loading.

This prevents a subsequent vehicle from being first parked in the target parking stall QB and prevents the vehicle 3 from disturbing surrounding traffic due to a K-turn operation, thus allowing for more favorable automatic parking.

The automatic parking control device 10 of the present embodiment includes the entry determiner 40 that determines whether or not the vehicle 3 enters the parking lot 2. The empty stall determiner 43 starts, in response to the vehicle 3 being determined to enter the parking lot 2, determining whether or not a parking stall Q present in the surroundings of the vehicle 3 is an empty stall QA based on sensing of surroundings by the surroundings detection sensor section 26.

This makes it possible to detect an empty stall QA before the vehicle 3 reaches the getting-out location PA.

In the automatic parking control device 10 of the present embodiment, if there is no empty stall QA, the automatic travel controller 48 generates an automatic travel route U for the vehicle 3 to travel on the passing route T to reach the current location after the entry into the parking lot 2 and performs control to cause the vehicle to travel on the automatic travel route U. Then, while the vehicle 3 travels on the automatic travel route U, the empty stall determiner 43 determines whether or not a parking stall Q present in the surroundings of the vehicle 3 is an empty stall QA based on sensing of surroundings by the surroundings detection sensor section 26.

This makes it possible to detect a new empty stall QA even in a case where no empty stall QA is detected before the occupant 4 gets out of the vehicle 3.

The above-described embodiment is merely an example of an aspect of the present invention and any modifications and applications are possible without departing from the spirit of the present invention.

(Modification Example 1)

In a case where when the vehicle 3 reaches a target parking stall QB, another vehicle is already parked in the target parking stall QB, that is, the determination result in step Sa20 is No in FIG. 5 described above, if another empty stall QA is stored in the empty stall storing section 44, the vehicle 3 may be parked in this empty stall QA.

Specifically, the target parking stall setting section 47 determines, as a target parking stall QB, another empty stall QA stored in the empty stall storing section 44, and the automatic travel controller 48 sets an automatic travel route U for the vehicle 3 to reach the target parking stall QB from the current location and to be loaded in a head-in manner and causes the vehicle 3 to automatically travel along the automatic travel route U and to be automatically loaded into the target parking stall QB.

In this case, the target parking stall setting section 47 may set, from among other empty stalls QA, an empty stall QA a distance to travel to which from the current location is the shortest or an empty stall QA determined to be an empty stall QA at the latest timing as a new target parking stall QB. The distance to travel refers to a distance for the vehicle 3 to travel to reach the empty stall QA from the current location. The distance is calculated with traffic regulations such as a one-way traffic taken into consideration.

More specifically, the empty stall storing section 44 stores, as one piece of information regarding an empty stall QA, time when the determination of the empty stall QA is made by the empty stall determiner 43 (hereinafter, referred to as determination time).

An empty stall QA is detected during each of a first period from the entry of the vehicle 3 into the parking lot to the reception of automatic loading instructions (in FIG. 4, a period from step Sa1 to step Sa4) and a second period when the vehicle 3 automatically travels along the automatic travel route U (a period from step Sa1° in FIG. 4 to step Sa12 in FIG. 5). The empty stall QA is stored in the empty stall storing section 44.

Then, if when the vehicle 3 reaches the target parking stall QB, there is another vehicle already parked in the target parking stall QB, the target parking stall setting section 47 sets one of empty stalls QA stored in the empty stall storing section 44 as a target parking stall QB based on the distance to travel from the current location and the determination time in the following manner.

First, the target parking stall setting section 47 selects an empty stall QA the distance to travel to which is the shortest from among empty stalls QA detected during the first period and an empty stall QA the distance to travel to which is the shortest from among empty stalls QA detected during the second period and compares the distances to travel to both the empty stalls QA with each other. In a case where a difference between the distances to travel is less than a predetermined value as a result of this comparison, the target parking stall setting section 47 sets the empty stall QA detected during the second period, i.e., the empty stall QA detected at the latest timing, as a target parking stall QB.

Thus, in a case where the difference between the distances to travel to both the empty stalls QA is less than the predetermined value, it is possible to preferentially set, as a target parking stall QB, the empty stall QA elapsed time after the detection of which is short and that is highly likely to be vacant even at the present time.

Meanwhile, in a case where the difference between the distances to travel to both the empty stalls QA is equal to or more than the predetermined value, the target parking stall setting section 47 sets, as the target parking stall QB, the empty stall QA the distance to travel to which is the shorter. For example, in a case where the empty stall QA detected during the first period is the shorter in distance to travel than the empty stall QA detected during the second period by the predetermined value or more, the target parking stall setting section 47 sets the empty stall QA detected during the first period as a target parking stall QB.

Thus, it is possible to preferentially set the obviously closer one of both the empty stalls QA as a target parking stall QB.

It should be noted that in the present modification example, in a case where there is no another empty stall QA stored in the empty stall storing section 44, the empty stall determiner 43 may search for still another empty stall QA by continuously detecting the empty stall QA based on sensing by the surroundings detection sensor section 26 while the automatic travel controller 48 sets a route to return to the above-described passing route T from the current location, sets an automatic travel route U to move back and forth on the passing route T, and causes the vehicle 3 to automatically travel along the automatic travel route U.

Modification Example 2

During the automatic loading operation, the notification controller 49 may provide a notification of a target parking stall QB to the smartphone 12 of the occupant 4.

In this case, the notification controller 49 may send the getting-out location PA and a location of the target parking stall QB to the smartphone 12 and the smartphone 12 may display these locations on the display 12B. Further, the smartphone 12 may acquire map data showing an outline of the parking lot 2 from an appropriate server such as an external server and display the getting-out location PA and the target parking stall QB superimposed on a map of the map data.

This allows the occupant 4 to know the location of the target parking stall QB, i.e., a location where the vehicle 3 is to be parked.

Further, the map of the map data may be an aerial photograph. By virtue of the map being an aerial photograph, all the parking stalls Q within the parking lot 2 can be displayed.

Further, the notification controller 49 may also send a location of another empty stall QA to the smartphone 12 in addition to the target parking stall QB to cause the smartphone 12 to display the target parking stall QB and the other empty stall QA on the display 12B.

Figure 8:
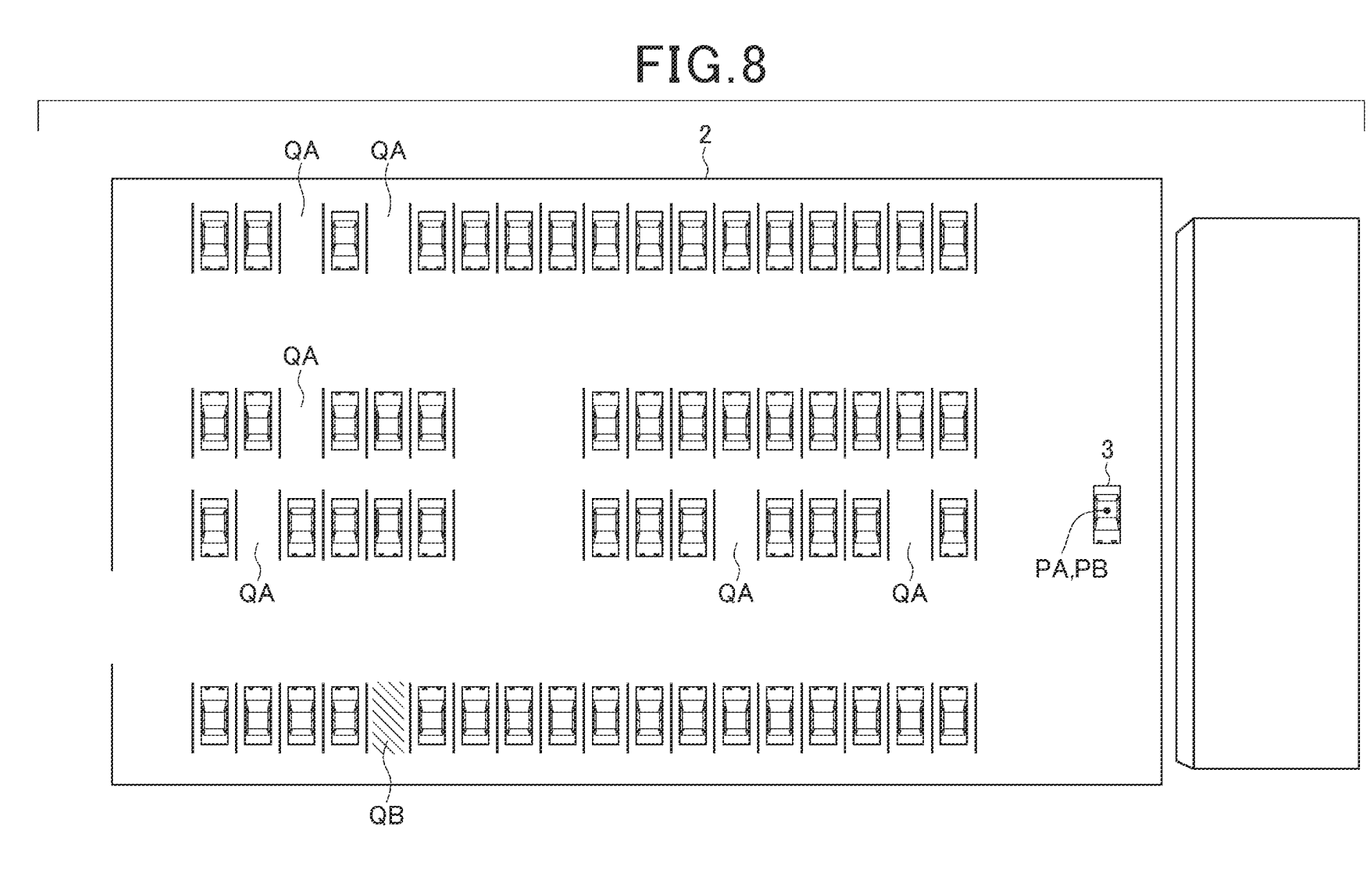
FIG. 8 shows an example of display of an empty stall QA and a target parking stall QB according to a modification example of the present invention.

In this case, the notification controller 49 may function as a display controller that performs display control in which the locations of the target parking stall QB and the other empty stall QA are sent to the smartphone 12 with a display manner of the target parking stall QB or/and the other empty stall QA specified so that the target parking stall QB and the other empty stall QA are displayed in display manners different from each other as shown in FIG. 8. The display manners can be differentiated by, for example, changing display color, pattern, size, or blinking. Alternatively, the display manners can be differentiated by hiding the empty stall QA except the target parking stall QB, attaching icons different from each other, or the like.

By virtue of the target parking stall QB being different in display manner from the other empty stall QA, the occupant 4 can clearly know the target parking stall QB.

It should be noted that in a case where the occupant 4 specifies another empty stall QA by operating the smartphone 12, the target parking stall setting section 47 may replace the target parking stall QB with the empty stall QA specified by the occupant 4, thereby allowing the occupant 4 to change the target parking stall QB.

Modification Example 3

The automatic parking control device 10 acquires the location of a parking stall Q and information regarding presence or absence of another vehicle in the parking stall Q from the result of sensing by the surroundings detection sensor section 26.

However, the automatic parking control device 10 may acquire information regarding an empty stall QA from a device that delivers availability of the parking stalls Q (parking states of other vehicles) in the parking lot 2 through an appropriate communication.

(Other Modification Examples) The block diagram of FIG. 1 is a schematic diagram showing components divided according to main processing contents for the purpose of easy understanding of the invention of the present application and the components can be divided into a larger number of components according to processing contents. Further, the components can be divided such that a single component performs a larger number of processes.

For example, in FIG. 1, the automatic parking control device 10 may include the communication unit 27, the surroundings detection sensor section 26, the vehicle control unit 25, etc.

REFERENCE SIGNS LIST

1 automated valet parking system
2 parking lot
3 vehicle
10 automatic parking control device (in-vehicle device)
12 smartphone
25 vehicle control unit
26 surroundings detection sensor section (sensor section)
27 communication unit
40 entry determiner
41 location estimator
42 map generator
42A map data
43 empty stall determiner
44 empty stall storing section
45 instruction acquirer
46 getting-out location storing section
47 target parking stall setting section
48 automatic travel controller
49 notification controller (display controller)
PA getting-out location
PB destination location
Q parking stall
QA empty stall
QB target parking stall
T passing route
U automatic travel route (travel route)
Ua K-turn route

What is claimed is:

1. An in-vehicle device comprising:
a processor and a memory,
wherein the memory includes an empty stall storing section storing information regarding a location of an empty stall determined by an empty stall determiner in association with a passing route of a vehicle,
wherein the processor includes
an entry determiner determining whether or not the vehicle enters a parking lot;
a location estimator estimating a current location of the vehicle;
a map generator sequentially obtaining the passing route, which is a route where the vehicle has passed from an entry of the parking lot to a getting-out location where an occupant gets out from the vehicle, by tracing the current location estimated by the location estimator while the vehicle is in the parking lot;
the empty stall determiner determining, based on sensing of surroundings by a sensor section provided in the vehicle, along the passing route, whether or not a parking stall present in surroundings of the vehicle is the empty stall;
a notification controller outputting a notification to the occupant regarding the getting-out location and the location of a target parking stall which is the empty stall where the vehicle is to be parked;

an automatic travel controller, based on the sensing of the surroundings by the sensor section, generating an automatic travel route which travels the vehicle along the passing route from the getting-out location, wherein the automatic travel controller controls the vehicle to travel along the automatic travel route, and when the vehicle reaches at a position where the vehicle starts performing a loading operation into the empty stall, the vehicle is loaded merely by a forward motion without a turning operation to perform a direction change from a reverse motion to the forward motion, and the automatic travel controller performs control to cause the vehicle to be parked; and a target parking stall setting section setting a new target parking stall which is a new empty stall, when the vehicle reaches the target parking stall, another vehicle is already parked in the target parking stall, from among other empty stalls wherein the new empty stall has a distance to travel to which from the current location is the shortest or the new empty stall is determined to be an empty stall at the latest timing.

2. The in-vehicle device according to claim 1, wherein the empty stall determiner starts, in response to the vehicle being determined to enter the parking lot, determining whether or not the parking stall present in the surroundings of the vehicle is the empty stall based on the sensing of the surroundings by the sensor section.

3. The in-vehicle device according to claim 1, wherein the processor further includes a display controller performing control to cause the empty stall where the vehicle is to be parked and another empty stall to be displayed in different manners.

4. A control method for an in-vehicle device that is to be installed in a vehicle, the method comprising:

an entry determination step of determining whether or not the vehicle enters a parking lot;

a location estimation step of estimating a current location of the vehicle;

a map generation step of sequentially obtaining the passing route, which is a route where the vehicle has passed from an entry of the parking lot to a getting-out location where an occupant gets out from the vehicle, by tracing the current location while the vehicle is in the parking lot;

an empty stall determination step of determining, based on sensing of surroundings by a sensor section provided in the vehicle, along the passing route, whether or not a parking stall present in surroundings of the vehicle is an empty stall;

a notification step of outputting a notification to the occupant regarding the getting-out location and the location of a target parking stall which is the empty stall where the vehicle is to be parked;

an empty stall storing step of storing information regarding a location of the empty stall determined in the empty stall determination step in association with a passing route of the vehicle;

an automatic travel control step of, based on the sensing of the surroundings by the sensor section, generating an automatic travel route which travels the vehicle along the passing route from a getting-out location, traveling vehicle along the automatic travel route, and when reaching the vehicle at a position where the vehicle starts performing a loading operation into the empty stall, loading the vehicle merely by a forward motion without a turning operation to perform a direction change from a reverse motion to the forward motion, and performing control to cause the vehicle to be parked; and a target parking stall setting step of setting a new target parking stall which is a new empty stall, when the vehicle reaches the target parking stall, another vehicle is already parked in the target parking stall, from among other empty stalls wherein the new empty stall has a distance to travel to which from the current location is the shortest or the new empty stall is determined to be an empty stall at the latest timing.

5. The control method according to claim 4, wherein the determining in the empty stall determination step is started in response to the vehicle being determined to enter the parking lot in the entry determination step.

6. The control method according to claim 4, further comprising: a display control step of displaying the empty stall where the vehicle is to be parked and another empty stall in different manners.

* * * * *